June 1, 1926.
W. E. WILLIAMS
AUTOMOBILE WHEEL
Filed Sept. 8, 1919
1,586,545
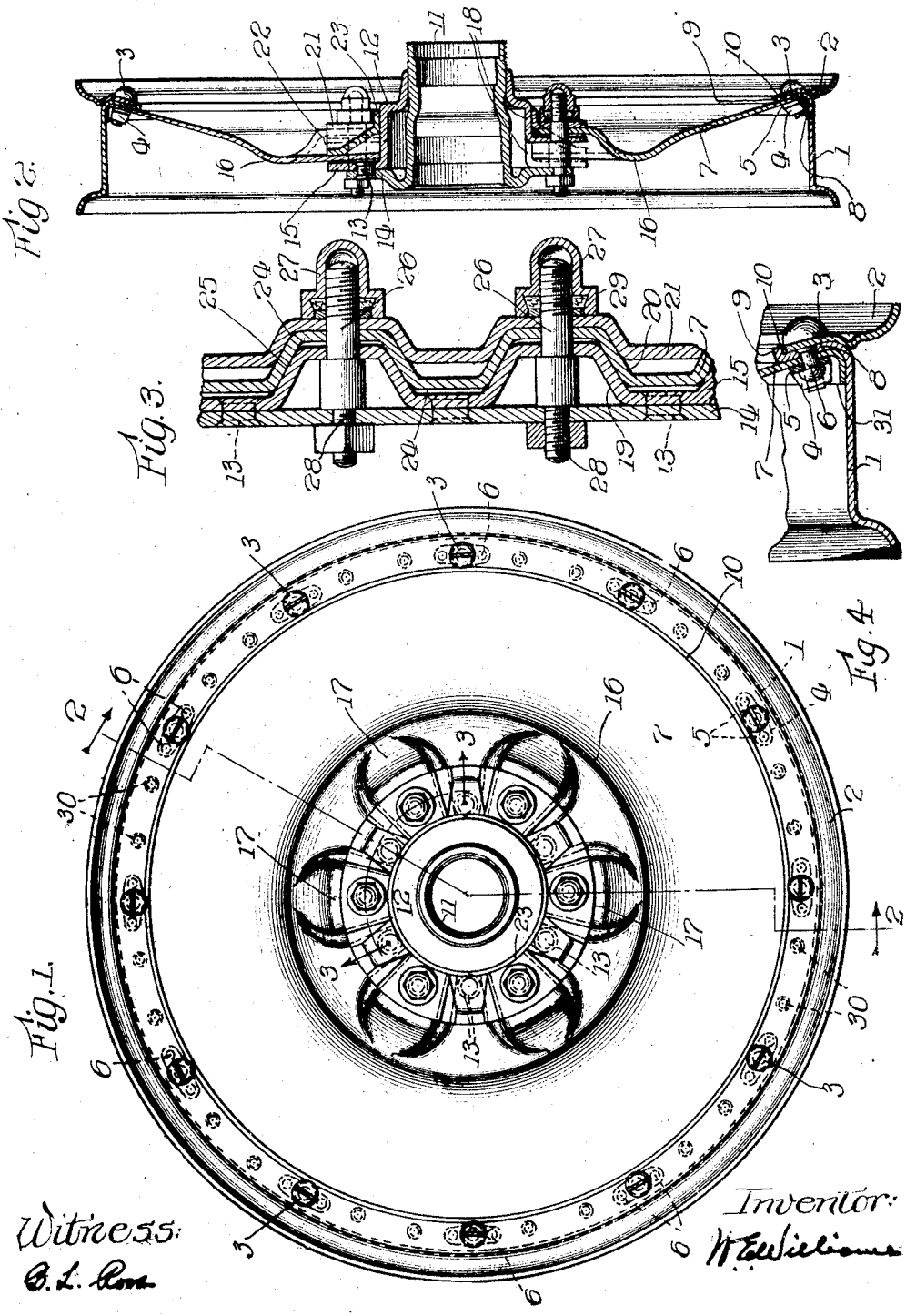
Witness:
B. L. Ross
Inventor:
W. E. Williams Patented June 1, 1926.

1,586,545

UNITED STATES PATENT OFFICE.

WILLIAM ERASTUS WILLIAMS, OF CHICAGO, ILLINOIS, ASSIGNOR TO AMERICAN STEEL FOUNDRIES, OF CHICAGO, ILLINOIS, A CORPORATION OF NEW JERSEY.

AUTOMOBILE WHEEL.

Application filed September 8, 1919. Serial No. 322,389.

The object of my invention is to provide a disk steel wheel that will be light, very strong, cheaply made, beautiful in appearance and easily demounted, as relates to the wheel itself and the rubber tires applied thereto.

Reference will be had to the accompanying drawing, in which Figure 1 is a front elevation of the wheel. Figure 2 is a vertical cross sectional elevation on line 2—2 of Figure 1. Figure 3 is a circular cross section on an enlarged scale on line 3—3 of Figure 1. Figure 4 is a detailed feature of the rim on an enlarged scale.

1 indicates the ordinary front wheel rim, but this may have a shape adapted for any type of tire.

The rim 1 in this case forms the function of the ordinary iron tire and felloe-band of the wooden wheel or the ordinary rim of the wire wheel.

For purposes of removing the tire I provide the companion flange 2 as a separate piece, which is secured to the main rim 1 by a series of bolts or screws 3. The drawing shows securing by screws entering small drop forged blocks 4, provided with small flanges 5 by means of which the blocks 4 are secured to the main rim 1 by rivets 6 passing through the wheel disk 7 which is the main member of the wheel.

The drawing indicates the screws as having rounded heads, but hexagon or square headed screws may be used if desired.

The main rim 1 is provided with a flange 8 which is turned over at 9 to form a shoulder for the inner edge 10 of the companion flange or rim 2. Thus any shocks or severe loads that may be encountered by the flange 2, as in running alongside the car track wherein some projecting object might engage the flange 2, instead of the rubber tire, will be taken up by the flange 10 resting against the flange 8, and not necessarily be carried by the screws 3, although they will aid in carrying such a load. The flanges 8 and 10 are not parallel to the plane of the wheel, but inclined as is also the corresponding portion of the disk 7. This inclination permits the screws 3 to pass freely through the holes in the flange 10 and yet when drawn tightly they exert an outward pressure to hold the flange 2 outward in its work as well as laterally to hold the tire in place.

11 indicates the ordinary pleasure car wheel hub made as the same is made to suit the bearings required for the practice in use with wooden wheels and to adapt my disk 7 as a demountable disk fitting both the front and rear wheel I provide the adapter member 12, which passes over the normal inside hub and is secured thereto by rivets 13, which pass through the flange 14 of the regular hub 11 and the flange 15 of my member 12. A similar construction is provided for the rear wheel.

My disk 7 is made of a sheet of metal which is thinner at the margin and thicker around the hub portion and to give this disk strength and a slight degree of elasticity I press in the swell or bulge 16 which merges into a series of radial corrugations 17 which terminate in a bearing on the surface 18 of the member 12.

As shown, the flange 15 of the member 12 has corrugations 19 in which fit corrugations 20 of the disk 7.

Outside the disk, around the hub, I provide a corrugated clamping ring 21 which is corrugated in a peculiar manner, in that it has very deep corrugations at this outer margin 22, fitting the disk at this circle and a plain straight flange at its inner margin 23, the purpose of this feature of the flange 22 is that it makes a fillet in the bottom of the corrugations around the hub which facilitates the washing and covers up the otherwise square corner that would occur if this tapering feature of the corrugations of the flange 21 were not used.

The greatest strains on a wheel occur immediately around the hub and my corrugations 17 furnish this extra stiffness required over a smooth plate and they thereby permit a much thinner disk to be used than if the corrugations were not present. These corrugations add to the appearance and they are easily washed and since they terminate but a short distance from the hub they allow the main body of the wheel to be perfectly smooth for a fine appearance and easy washing.

The corrugations serve other purposes besides giving strength to the wheel, namely, this wheel is of the demountable type wherein the wheel and tire are demounted from the hub when occasion requires a rapid change of tires well known in automobile practice. In this demounting of the entire wheel it is desirable that the wheel be removed as easily as may be and at the same time when it is secured in place it should be secured as rigidly as possible so as not to squeak or get loose in service. Where a plain disk is used and clamped on to the hub by a demountable fastening it has been found that even the slightest bit of articulation, caused by small clearances in the fitting of the parts is seriously objectionable, so that the makers of disk wheels that are demounted at the hub are compelled when using flat disks to make the fit so tight that the wheels are demounted with inconvenience, but with my corrugated and inclined surfaces as indicated by Figure 3 the central bore and the fits around the bolt studs need not be close but may be free and when the bolts or studs are screwed up tightly the corrugations automatically make a tight fit against movements in any direction and yet when the screws or nuts are loosened the wheel will readily come off.

In Fig. 3 there is a clearance indicated by 24 between the bottoms and summits of the corrugations of the disk and of the flange 15 to which it is secured. This clearance 24 causes contact to be made on the surfaces 25 thus always insuring a snug position of the disk on the hub and making unnecessary any close fit of the disk on the studs or to the hub bore on which it is supported.

My disk is clamped to the hub through the medium of the stud bolts 26 provided with the nuts 27. The said bolts also assist in connecting the flange 15 to the ordinary hub flange 14 through which the stud 28 extends.

The nut 27 is provided with a lock washer 29 enclosed within the base of the nut.

The disk 7 is secured to the main rim 1, not only by the rivets and screws 3 when in place, but also by additional rivets 30 passing through the flange 8 and the margin of the disk only. The edge 31 of the disk 7 is turned over to fit the inside of the tread of the rim and while I have not shown this portion 31, riveted or otherwise secured to the rim, I will, with some thicknesses of disk plate, weld or rivet through this portion 31 and the rim 1.

What I claim is:—

1. A disk wheel composed of rim, disk and hub, said disk suitably connected to the rim and having a smooth, approximately conical surface on the outer portion and a radially corrugated portion adjacent to the hub, a hub provided with a corrugated flange adapted to register with the radial corrugations of the disk, means for clamping the disk at the corrugations to the hub.

2. A wheel composed of a rim, disk and hub, said disk having a smooth body portion bulged in its middle region and provided with radial corrugations around the hub, the hub having a corrugated flange adapted to register with the corrugations of the disk and a series of studs or bolts adapted to secure the disk to the hub.

3. A wheel composed of a disk, hub and rim, said disk suitably fastened to the rim and provided with a dished main body portion having at a distance from the rim an abrupt annular swell or bulge, for elasticity, merging into a series of radial corrugations for stiffness around the hub, with means for clamping the disk to the hub.

4. In a disk wheel, the combination with the hub and a rim, of a disk body extending between the hub and rim, the wheel provided adjacent the hub zone with relatively short pocket-like depressions of substantial depth terminally merging into the general plane of the disk, and the outer zone presenting an unbroken surface.

5. In a disk wheel, the combination with the hub and rim, of a disk body extending between the hub and rim, the wheel provided adjacent the hub zone with annularly spaced depressions terminally abrupt at one end and at the other merging into the general plane of the disk, and the outer zone presenting an unbroken surface.

6. In a disk wheel, the combination with the hub and rim, of a disk extending between the hub and rim, the wheel provided adjacent the hub zone on one side only with annularly spaced depressions of substantial depth, and the outer zone presenting an unbroken surface.

7. In a disk wheel, the combination with the hub and rim, of a disk body extending between the hub and rim, the wheel provided adjacent the hub zone with annularly spaced depressions of substantial depth with their terminal portions abrupt at one end and at the other merging into the general plane of the disk, and the outer zone presenting an unbroken surface.

8. In a wheel, the combination with the central hub portion and the peripheral rim portion, of an intermediate forwardly concave disk portion, the circle of its greatest depth dividing the disk into an inner and an outer zone, the inner zone provided with radially extending spaced pocket-like depressions and the outer zone having a substantially smooth surface.

9. In a wheel, the combination with the central hub portion and the peripheral rim portion, of an intermediate forwardly concave disk portion, the circle of its greatest depth dividing the disk into an inner and an outer zone, the inner zone provided with radially extending spaced pocket-like depressions and the outer zone having a substantially smooth surface, and a radially corrugated or fluted hub member interlocked with the depressions of the disk and secured to the hub proper.

Signed at Chicago, in the county of Cook and State of Illinois, this third day of September, 1919.

WILLIAM ERASTUS WILLIAMS.